United States Patent
López Montero et al.

(10) Patent No.: US 11,993,518 B2
(45) Date of Patent: May 28, 2024

(54) CO$_2$ CAPTURE USING ALKALINE MEDIA FOR THE PREPARATION OF SODIUM CARBONATE

(71) Applicants: UNIVERSIDAD DE CASTILLA LA MANCHA, Albacete (ES); ALCOHOLES DE TOMELLOSO S.A. (ALTOSA), Tomelloso (ES)

(72) Inventors: Juan Antonio López Montero, Tomelloso (ES); Francisco Javier Nieto Sepúlveda, La Puebla de Almoradiel (ES); Carlos Alonso Moreno, Albacete (ES); Jesús Canales Vázquez, Albacete (ES); Santiago García Yuste, Albacete (ES); Jorge Enrique Zafrilla Rodríguez, Albacete (ES); Abdessamad Gueddari Aourir, Albacete (ES)

(73) Assignees: UNIVERSIDAD DE CASTILLA LA MANCHA, Albacete (ES); ALCOHOLES DE TOMELLOSO S.A. (ALTOSA), Tomelloso (ES)

( * ) Notice: Subject to any disclaimer, the term of this patent is extended or adjusted under 35 U.S.C. 154(b) by 0 days.

(21) Appl. No.: 18/036,390

(22) PCT Filed: Nov. 10, 2021

(86) PCT No.: PCT/EP2021/081289
§ 371 (c)(1),
(2) Date: May 10, 2023

(87) PCT Pub. No.: WO2022/101294
PCT Pub. Date: May 19, 2022

(65) Prior Publication Data
US 2023/0322568 A1    Oct. 12, 2023

(30) Foreign Application Priority Data
Nov. 10, 2020  (EP) .................................... 20382970

(51) Int. Cl.
*C01D 7/07* (2006.01)
*B01D 53/14* (2006.01)
(Continued)

(52) U.S. Cl.
CPC ........... *C01D 7/07* (2013.01); *B01D 53/1412* (2013.01); *B01D 53/1418* (2013.01);
(Continued)

(58) Field of Classification Search
CPC ................. B01F 27/112; B01F 35/531; B01F 2215/0422; B01D 53/18
(Continued)

(56) References Cited

U.S. PATENT DOCUMENTS 3,644,089 A    2/1972  Minz et al.
3,751,560 A    8/1973  Neumann
(Continued)

FOREIGN PATENT DOCUMENTS

BR    PI1100894 B1    9/2018
CN    106492733 A  *  3/2017
(Continued)

OTHER PUBLICATIONS

CN-106492733-A English translation (Year: 2017).*
(Continued)

*Primary Examiner* — Anita Nassiri-Motlagh
(74) *Attorney, Agent, or Firm* — Hassan Abbas Shakir; Shakir Law PLLC (57) ABSTRACT

A carbonator reactor includes a cylindrical body, a nozzle for supplying a gas stream, inside the carbonator reactor and above the surface of a liquid phase and where the nozzle is
(Continued)

located at the top of the reactor body, an inlet, an outlet, means for regulating the temperature and the pressure, a stirring system and at least one baffle regulating the stirring of the liquid phase and the mass transfer of the gas into the liquid surface, at least one impeller having inclined blades that make an angle from 5° to 60° with respect to the vertical axis. The reactor prepares sodium carbonate and has a configuration for the mass transfer of a gas phase in a liquid phase. A method for the preparation of sodium carbonate by means of the carbonator reactor by capturing $CO_2$ in an NaOH aqueous solution, directly on the free surface of the liquid phase.

19 Claims, 6 Drawing Sheets

(51) Int. Cl.
*B01D 53/18* (2006.01)
*B01D 53/34* (2006.01)
*B01D 53/62* (2006.01)
*B01D 53/78* (2006.01)
*B01F 27/112* (2022.01)
*B01F 35/53* (2022.01)

(52) U.S. Cl.
CPC ..... *B01D 53/1475* (2013.01); *B01D 53/1493* (2013.01); *B01D 53/18* (2013.01); *B01D 53/346* (2013.01); *B01D 53/62* (2013.01); *B01D 53/78* (2013.01); *B01F 27/112* (2022.01); *B01F 35/531* (2022.01); *B01D 2251/304* (2013.01); *B01D 2251/604* (2013.01); *B01D 2257/504* (2013.01); *B01F 2215/0422* (2013.01)

(58) Field of Classification Search
USPC .......................................................... 423/421
See application file for complete search history.

(56) References Cited

U.S. PATENT DOCUMENTS

| | | | |
|---|---|---|---|
| 3,868,444 A | | 2/1975 | Frevel |
| 5,711,902 A | * | 1/1998 | Hsu ................. B01F 23/23341 261/93 |
| 6,447,743 B1 | | 9/2002 | Devic et al. |
| 2008/0193365 A1 | | 8/2008 | Coustry et al. |
| 2018/0078917 A1 | * | 3/2018 | Li .......................... C01F 11/18 |

FOREIGN PATENT DOCUMENTS

| | | |
|---|---|---|
| CN | 106902723 A | 6/2017 |
| JP | S6146236 A1 | 3/1986 |
| WO | 2011129707 A1 | 10/2011 |

OTHER PUBLICATIONS

International Search Report for related application PCT/EP2021/081289 prepared by the European Patent Office and dated Feb. 23, 2022, 4 pgs., in English.
Written Opinion by the International Searching Authority for related application PCT/EP2021/081289 prepared by the European Patent Office and dated Feb. 23, 2022, 7 pgs., in English.
International Preliminary Examination Report for related application PCT/EP2021/081289 prepared by the European Patent Office and having a completion date of Feb. 20, 2023, 6 pgs., in English.

* cited by examiner

CO₂ CAPTURE USING ALKALINE MEDIA FOR THE PREPARATION OF SODIUM CARBONATE

CROSS-REFERENCE TO RELATED APPLICATIONS

This application is a national stage under 35 U.S.C. § 371 of PCT patent application PCT/EP2021/081289 filed on 10 Nov. 2021, which is pending and which is hereby incorporated by reference in its entirety for all purposes. PCT/EP2021/081289 claims priority to European Patent Application 20382970.0 filed 10 Nov. 2020, which is hereby incorporated by reference in its entirety for all purposes.

TECHNICAL FIELD

The invention relates to a method for the preparation of sodium carbonate, which in turn, may contribute to decrease carbon dioxide emissions to the atmosphere.

Therefore, the present invention can be included within the technical field of Greenhouse Gas (GHG) removal, since the invention can eliminate one of the main GHGs such as carbon dioxide ($CO_2$) through a method comprising the capture of $CO_2$ using an alkaline medium such as NaOH as absorber and its chemical conversion into a marketable product such as sodium carbonate ($Na_2CO_3$).

BACKGROUND OF THE INVENTION

Sodium carbonate ($Na_2CO_3$), usually referred to as "soda ash", has long been one of the most important chemical compounds produced due to its broad range of applications, e.g. in cleaning products, glass manufacturing, chemical manufacturing, food, personal care products, pulp and paper products, swimming pool maintenance, etc.

One of the most established methods to produce sodium carbonate that became the industry standard for nearly two centuries was the Leblanc method. The product of this reaction is a dark ashy material that contains a mixture of sodium carbonate, calcium sulfide, carbon dioxide and other by-products. Afterwards, the sodium carbonate is extracted from this mixture and purified. However, this method has the disadvantage that it required large amounts of energy. For this reason, there has always been a lookout for an alternative method for producing sodium carbonate that is less energy-demanding.

Solvay process followed the Leblanc method and was based on the formation of sodium bicarbonate by treating sodium chloride with carbon dioxide and ammonia. Then, sodium carbonate is obtained by simply heating the sodium bicarbonate. The solvay process presented the drawback that generated sodium chloride and ammonia.

On the other hand, during the decade from 2008-2018, a yearly increase of about 1.5% of the carbon dioxide emissions at a global level has been observed, which, in turn, results in a carbon dioxide release of circa 33 Gt to the atmosphere. Consequently, several international organisms have been forced to set and develop new strategies to deal with the negative effects in natural environment and global warming caused by carbon dioxide emissions.

U.S. Pat. No. 3,751,560 described the production of sodium carbonate monohydrate as a crystalline precipitate conducted in at least one agitated reactor. The suitable equipment to carry out this process comprised agitated tanks equipped with a reactor which contained temperature control means and hollow agitators through which the $CO_2$ was delivered.

This process for the preparation of sodium bicarbonate from a sodium hydroxide solution by reaction with carbon dioxide took place as a two-stage process using various reactors and could not be carried out at high concentrations of sodium carbonate. The process has the disadvantages, that the water is evaporated prior to the completion of the reaction, which may drag traces of NaOH, which is corrosive, damaging the reactor. Furthermore, a calcination step is carried out which generates more $CO_2$.

Later on, JP S61 46236 A disclosed a reaction vessel 1 purged with gas, wherein a reaction liquid was introduced continuously into said vessel, said reaction liquid being overflown successively into plural reaction chambers (7) and a stabilization chamber (8) to contact a gas stream with a NaOH-liquid to form a mixture of $NaHCO_3/Na_2CO_3$. The carbonator reactor comprises a gas inlet (18), above the surface of the liquid whereby the gas stream (2) is provided into a carbonator reactor (NaOH aqueous solution. Said carbonator reactor also comprises a horizontal stirring shaft (11) comprising rotating blades (10) for stirring and single-rotating pong.

Furthermore, the carbonator reactor comprises an outlet (23) for removing liquid/slurry from the carbonator reactor, cooling pipes, which allow some temperature control and some means of pressure to maintained the pressure constant in the carbonator, however, not modulated. The design of the carbonator reactor of JP S6146236A is a simple design which presents the disadvantage that it does not provide an efficient mass control.

Afterwards, application patent, WO2011/129707, disclosed a carbonator reactor design for reacting soluble hydroxides (e.g. NaOH, KOH, $NH_4OH$) with $CO_2$ from a pure source to produce high purity carbonate/bicarbonate slurry. Said reactor comprising a body, means for regulating the temperature and the pressure, an impeller mounted on a hollow shaft drawing gas from the gas volume at the top of the reactor into the bulk of the liquid phase and a shaft having 3 baffles having a 100 mm width extension. Furthermore, the reactor comprised an inlet, located at the bottom of the reactor body, for the supply of $CO_2$ gas. As described in WO2011/129707, the carbonation reactor's agitator is specially designed to optimise the contact area between the $CO_2$ and the reacting solution components providing an optimised bubble size and bubble spread distribution in the liquid phase. Being the function of the impeller to draw gas from the surface to the bottom of the reactor. Thus, the carbonator reactor and its components as described in WO 2011/129707, was designed to perform homogenous reactions, thus in the liquid reaction bulk, rather than on the surface of the liquid phase. More particularly, this reactor was not designed to work with high concentrations of sodium hydroxide as whether a solution of sodium hydroxide or flakes are used, these are always further diluted with water.

For instance, PI1100894-6 B1 refers to a process for producing sodium bicarbonate by reacting $CO_2$ with an aqueous sodium hydroxide solution. In this process, the aqueous sodium hydroxide solution is contacted with carbon dioxide obtained from alcoholic fermentation processes. The procedure is carried out either in a column-type spray or a filler column attached to a settler. This process is performed in a continuous regime and implies recirculation of reagents and/or products. Consequently, the process has the disadvantage that the reagents must be diluted or treated before contacting them, in order to avoid associated problems with the strong exothermic nature of the reaction alongside the recirculation of reagents and/or precipitated products that may cause obstructions in different parts of the system.

Thus, there is a need to provide an improved method and apparatus to manufacture sodium carbonate, easy to implement at an industrial scale, that provides a good mass transfer, low energy consumption, good yields, conversions and reaction rates and which allows working with high concentrations of the reactants. An improved apparatus having smaller installation dimensions low energy consumption and a small water footprint as well as it overcomes the above-mentioned drawbacks associated with the manufacture of $Na_2CO_3$ by capturing $CO_2$ in an aqueous sodium hydroxide solution, thus helping to reduce the negative carbon dioxide emissions.

SUMMARY OF THE INVENTION

The present invention refers to a new and optimized carbonator reactor, which is particularly suitable to provide sodium carbonate and to achieve an optimized chemical reaction between the $CO_2$ comprised in the gas stream and the liquid absorbent, in particular a NaOH aqueous solution. Thus, the carbonator reactor of the first aspect presents an optimized configuration that favours the mass transfer of gases, in particular of $CO_2$ gas) in the liquid phase, particularly in the gas-liquid interface formed in the method for the preparation of sodium carbonate described herein.

The term carbonator reactor, in the context of the present invention, may also be referred to as "carbonation stirred reactor" or "stirred reactor".

The first aspect of the present invention refers to a carbonator reactor comprising at least:
  a body (103, 203), which comprises a cylindrical shell, said body comprising:
    a nozzle (104, 204),
    at least an inlet (205a, 205b) adapted for introducing liquids, solids or mixtures thereof,
    at least one outlet (206) adapted for discharging a liquid phase or slurry,
  means for regulating the temperature (207), and
  means for regulating the pressure (208a, 208b),
  at least one baffle (115, 215) adapted to regulate the stirring of the liquid phase and the mass transfer of the gas into the liquid surface, preferably wherein the width (wd) of said baffle ranges from 1% to 15% of the internal diameter (D) of a cylindrical shell (109, 209) comprised in the body (103, 203) of the carbonator reactor (101, 201).
characterized in that the carbonator reactor (101, 201) further comprises:
  a stirring system (102, 202) comprising at least one impeller (113, 213) comprising inclined blades (114, 214), wherein said blades make an angle from 5° to 60° with respect to the vertical axis; and
  wherein the nozzle (104, 204) is adapted for supplying a gas stream, inside the carbonator reactor (1) and above the surface of a liquid phase, so the gas stream can come into direct contact with the surface of a liquid phase and wherein the nozzle is located at the upper portion of the reactor body within the upper 10% of the height of the reactor body.

Furthermore, the present invention provides an economic method that produces sodium carbonate by reacting carbon dioxide ($CO_2$) with an aqueous sodium hydroxide solution. This method does not require a high consumption of energy; on the contrary, it can generate a great amount of energy that can be used for other heating or cooling processes among other applications.

The carbonator reactor of the first aspect is suitable to be used in a method for the preparation of sodium carbonate, preferably in a method for the preparation of sodium carbonate, that involves the direct supply of a $CO_2$ gas stream on the free surface of a NaOH aqueous solution. The carbonator reactors of the first aspect can be easily installed and represent low construction costs compared to those associated with multiphasic contactor reactors commonly used in the field of the invention.

Thus, the second aspect of the present invention relates to a method for the preparation of sodium carbonate which comprises the use of the carbonator reactor of the first aspect and solves the above-mentioned problems in a differently manner compared to other known processes. The method of the second aspect, does not require contact techniques as it allows working with high concentrations of reagents, such as $CO_2$ and NaOH, preventing obstructions in the gas stream supply system, such as in the multiphasic contactors, after the $Na_2CO_3$ solid is generated. Thus, avoiding undesired stops during the production process of $Na_2CO_3$.

The second aspect present invention refers to a method for the preparation of sodium carbonate, which comprised at least the steps of:
  a) providing at least the carbonator reactor according to the first aspect (101, 201), said carbonator reactor containing a NaOH aqueous solution;
  b) supplying a gas stream comprising $CO_2$ to the at least one carbonator reactor provided in step a), wherein
    the gas stream is introduced in said carbonator reactor, above the surface of the NaOH aqueous solution, in such a way that the gas stream is in contact with the surface of the NaOH aqueous solution
    the reaction mixture is continuously stirred to generate a turbulent flow regime, wherein the gas stream of $CO_2$ is absorbed at the interface of the stirred liquid phase;
  c) stopping the supply of the gas stream comprising $CO_2$ to the carbonator reactor, and
  d) discharging the reaction mixture containing sodium carbonate from the at least one carbonator reactor and
  e) optionally, isolating the generated sodium carbonate from the discharged reaction mixture of step d).

Accordingly, the method of the present invention allows the capture of high concentrations of $CO_2$ such as, for example, that generated in AFP, wherein the $CO_2$ emission ratio is so high that conventional systems would need huge containers to store the diluted aqueous NaOH solution required to produce the same effect as when using highly concentrated solutions. Conventional processes wherein filled columns are used, even those having a high capture of $CO_2$, would demand columns with extremely large diameters and dimensions for capturing high concentrations of $CO_2$. Moreover, conventional gas reactors used in these processes, comprising agitation, bubbling columns, spray columns or tanks agitated with sparger systems are not suitable for handling high concentrations of reagents, since all of them would suffer halts in their process caused by potential obstruction of solid $Na_2CO_3$. This problem is usually resolved using dilute reagents as described in the aforementioned patent documents PI1100894-6 B1 and US2008/0193365. Conversely, these methods require a great amount of energy consumption to provide a good yield of sodium carbonate.

However, the process of the invention works in a semi-continuous regime, it allows the use of several independent reactors, without recirculation of reagents and/or products, to allow a continuous capture of $CO_2$. This advantage is very useful in cases where continuous $CO_2$ emissions are available, as for instance, in the production of alcoholic fermentation (AFP), where fermentation periods extend between 4 and 25 days.

DETAILED DESCRIPTION OF THE INVENTION

The first aspect of the present invention refers to a new and optimized carbonator reactor, which is particularly suitable to achieve an optimized chemical reaction between the $CO_2$ comprised in the gas stream and the liquid absorbent, in particular a NaOH aqueous solution. Thus, this carbonator reactor presents an optimized configuration that favours the mass transfer of the gas ($CO_2$) in the liquid, particularly in the gas-liquid interface formed in the method for the preparation of sodium carbonate described herein.

The first aspect of the present invention refers to a carbonator reactor comprising at least:

a body (103, 203), which comprises a cylindrical shell, said body comprising:
  a nozzle (104, 204),
  at least an inlet (205a, 205b) adapted for introducing liquids, solids or mixtures thereof,
  at least one outlet (206) adapted for discharging a liquid phase or slurry,
  means for regulating the temperature (207), and
  means for regulating the pressure (208a, 208b),
  at least one baffle (115, 215) adapted to regulate the stirring of the liquid phase and to improve the mass transfer of the gas into the liquid surface, preferably wherein the width (wd) of said baffle ranges from 1% to 15% of the internal diameter (D) of a cylindrical shell (109, 209) comprised in the body (103, 203) of the carbonator reactor (101, 201).
characterized in that the carbonator reactor (101, 201) further comprises:

a stirring system (102, 202) comprising at least one impeller (113, 213) comprising inclined blades (114, 214), wherein said blades make an angle from 5° to 60° with respect to the vertical axis; and
wherein the nozzle (104, 204) is adapted for supplying a gas stream, inside the carbonator reactor (1) and above the surface of a liquid phase, so the gas stream can come into direct contact with the surface of a liquid phase and wherein the nozzle is located at the upper portion of the reactor body within the upper 10% of the height of the reactor body.

Thus, the carbonator reactor of the first aspect, referred to as (1), may have the configurations according to FIG. 1, 2, 3, 4 and may be referred to as carbonator reactor (101) or carbonator reactor (201) or carbonator reactor (101, 201), wherein both embodiments are included.

The carbonator reactor of the first aspect is suitable to be used in a method for the preparation of sodium carbonate, preferably in a method for the preparation of sodium carbonate, that involves the direct supply of a $CO_2$ gas stream on the free surface of a NaOH aqueous solution. The carbonator reactors of the first aspect can be easily installed and represent low construction costs compared to those associated with multiphasic contactor reactors commonly used in the field of the invention.

In a preferred embodiment of the first aspect, the body of the carbonator reactor (1) comprises a cylindrical shell, a conical bottom and/or an ellipsoidal or torispherical head. This constructive geometry of the reactor body, enhances the mass transfer of a gas in the gas-liquid interface, for example of the $CO_2$ gas in the gas-liquid interface formed in processes when sodium carbonate is generated.

The carbonator reactor (1) of the first aspect comprises a stirring system which comprises inclined blades having a degree of inclination from 5° to 60° with respect to the vertical axis. This provides a simultaneous radial and axial flow, improving the homogenisation of the reactants, the yields and lowering the reaction times. More preferably, the stirring system of the carbonator reactor (1) of the first aspect comprises from 2 to 8 blades and/or having a width (wbl) from 15% to 30% of the diameter (d) of the stirrer (i.e., the exterior diameter formed by the blades set, see FIGS. 3a-3d), and/or a power number (Np) of between 0.4 and 4.3. More preferably, the stirring system comprises at least 3 blades, having each of them a degree of inclination from 20° to 45° with respect to the vertical axis.

In a more preferred embodiment, the stirring system of the first aspect comprises a motor, a stirred shaft and at least one impeller, which comprises inclined blades in order to create a radial and axial flow, preferably these blades have a degree of inclination from 5° to 60°, more preferably from 20° to 45°, with respect to the vertical axis and/or the impeller comprise from 2 to 8 blades, more preferably, comprising at least 3 blades, having a width (wbl) from 15% to 30% of the diameter (d) of the stirrer, i.e., the total exterior diameter formed by the blades set, and a power number (Np) of between 0.4 and 4.3. More preferably, the ratio between the diameter of the stirrer and the internal diameter of the reactor cylindrical shell (d/D) is preferably from 20% to 45%, more preferably from 25% to 35%. The preferred ratios, enhance the mass-transfer. Preferably, the impeller of the carbonator reactor of the first aspect does not comprises a hollow shaft adapted to provide a gas flow at the bottom of the reactor.

Thus, the stirring system of the first aspect improves the homogenisation of the reaction mixture and improve the hydrodynamic conditions, allowing a suitable distribution of the gases over the liquids as well as an elevated, specific and effective interfacial area. Likewise, the stirred system enhances the transfer of heat outside the carbonator reactor (1).

The baffles, in the content of the present invention, are adapted to regulate the stirring of the liquid phase and to improve the mass transfer of the gas into the liquid surface. Preferably, the baffles are also adapted to reduce the formation of precipitate at the centre of the reactor. In another preferred embodiment of the first aspect, the baffles, are attached to the internal wall of the reactor body and/or have a width (wd) ranging from 1% to 15% of the internal diameter (D) of the cylindrical shell of the body of the carbonator reactor (1). Thus, the size of swirls is reduced, improving the stirring efficiency and the mass transfer from the gas into the liquid. Preferably, the baffles, are attached to the internal wall of the reactor body and/or have a width (wd) ranging from 7% to 12% of the internal diameter (D) of the cylindrical shell of the body of the carbonator reactor (1). Additionally, the baffles of the carbonator reactor prevent the formation of circulatory flows and reduce the formation of vortices that affect the effectiveness of gas dispersion on the surface of the liquid phase by affecting its specific interfacial area.

Also, taking into account the thermodynamics of the method herein disclosed, the carbonator reactor according to the invention in combination with the stirring system, that keeps a turbulent flow regime in the reaction mixture, enhances the heat transfer extraction, thus improving the temperature control inside the carbonator reactor.

In another preferred embodiment of the first aspect, the means for regulating the temperature, comprise a heat extraction or a dissipation system, which allows the release of any heat generated in the system due to exothermic reactions, for instance the heat generated in a process to produce sodium carbonate or in the method according to the second aspect of the invention. Additionally, it can improve the thermal efficiency of other processes or produce other types of useful energy. In another preferred embodiment of the first aspect, comprises industrial control automatons, preferably Programmable Logic Controller (PLC) connected to temperature sensors installed in the reactor to regulate the temperature of the reaction mixture. The aforementioned heat extraction or dissipation system may be activated or deactivated, depending on a maximum set point temperature, by means of a solenoid valve located in the carbonator reactor of the first aspect. In another preferred embodiment of the first aspect, the heat dissipation system comprises a jacket and/or coil, which is configured for dissipating heat generated within the carbonator reactor, or in the method for the preparation of sodium carbonate of the second aspect. More preferably, the heat dissipation system comprises a heat transfer fluid selected from glycol, water or mixtures thereof. The heat dissipation systems that might be comprised in the carbonator reactor of the first aspects, can be selected from, means for regulating the temperature, dry air heaters or cooling towers, which can be used at high temperatures, in particular those which can be used at temperatures close to 160° C., thus avoiding the use of wet cooling towers with a significant water footprint. Preferably, the working temperature does not to exceed 160° C., thus, vapor generation is prevented and hence degradation of $Na_2CO_3$ is avoided.

In another preferred embodiment of the first aspect, the heat dissipation system can be connected to a proportional-integral-derivative controller (PID), in which the heat dissipation capacity can be measured and controlled by means of flow meters and temperature sensors connected to a cooling system. The latter, the cooling system, can be used for controlling the heat dissipation process in order to achieve the required heat dissipation according to the $CO_2$ absorption.

In another preferred embodiment of the first aspect, the carbonator reactor (1) comprises a level sensor installed at the top of the reactor in order to control the volume and amount of liquids or the mixtures inside the reactor body. Preferably, the level sensor is a non-contact measuring sensor, as they can work with agitated phases. Even more preferably, level sensor is a low frequency device to be able to work with liquids and vapours.

In another preferred embodiment of the first aspect, the carbonator reactor (1), the carbonator reactor (1) also comprises a pressure sensor and means for regulating the pressure. Even more preferably, the means for regulating the pressure can be calibrated pressure relief valves, compressor tank discharge pressure, and/or means for controlling the flow at the blower. For example, flow blowers or gas blowers all are able to regulate the pressure of the system. Preferably, non-contact pressure sensors and level sensors are used, wherein the level sensors are located at the top of the carbonator reactor (1), to prevent any potential spilling that can be generated by the vapours.

The volumetric mass transfer coefficient ($K_La$) may range from 0.04 $s^{-1}$ to 0.3 $s^{-1}$, at a temperature equal to or lower than 80° C. and a pressure equal to or lower than 0.35 barg.

In a preferred embodiment the carbonisation reactor of the first aspect comprises mechanical means adapted to work at pressures above the atmospheric pressure, this will help to increase the pressure of the gas stream comprising $CO_2$. In a particular embodiment, $CO_2$ centrifugal or positive displacement blower is used, for pressures up to a maximum of 2 barg. In another particular embodiment a low-pressure compressor connected to a pressure tank is used, as it allows the regulation of pressure and flow with its appropriate control elements for pressures from 2 to 20 barg, In another preferred embodiment of the first aspect, the carbonator reactor (1), further comprises flow sensors to measure the flow of $CO_2$, wherein the flow sensors may be connected to the PLC by means adapted to regulate the setpoints.

If a gas blower (for instance a $CO_2$ blower) is used, this flow will be regulated by varying the blower motor frequency with a PID integrated in the mentioned PLC, which is connected to the frequency variator.

The term gas injector or nozzle (104, 204) in context of the present invention, is understood as means that the nozzle is adapted for supplying a gas stream, preferably a stream of $CO_2$, inside the carbonator reactor (1) and above the surface of a liquid phase, in such a way that the gas stream can come into direct contact with the surface of a liquid phase and wherein the gas injector or nozzle is located at the upper portion of the reactor body within the upper 10% of the height of the reactor body. The reactor body has a height and wherein the reactor body comprises an upper portion and a lower portion, arranged below the upper portion according to the height. The location of the nozzle ensures that both the gas stream contacts the liquid phase, from above and avoids or prevents any obstruction as a result of any splashing of the liquid phase, when hot or under stirring. More preferably the liquid phase is a NaOH aqueous solution.

In another preferred embodiment of the first aspect, the carbonator reactor (1), further comprises at least one inlet adapted for introducing liquids, slurries, solids or mixtures thereof. More preferably, the carbonator reactor (1), further comprise at least one inlet specifically configured for introducing liquids or slurries, and at least one inlet specifically configured for introducing solids and/or at least one outlet adapted for discharging a liquid phase or slurry, in particular, this outlet is specifically configured for discharging the reaction mixture containing sodium carbonate of the method for the preparation of sodium carbonate according to the second aspect described in this document.

The second aspect of the present invention refers to a method for the preparation of sodium carbonate, which comprises at least the steps of:

The second aspect present invention refers to a method for the preparation of sodium carbonate, which comprised at least the steps of:

a) providing at least the carbonator reactor according to the first aspect (101, 201), said carbonator reactor containing a NaOH aqueous solution;

b) supplying a gas stream comprising $CO_2$ to the at least one carbonator reactor provided in step a), wherein the gas stream is introduced in said carbonator reactor, above the surface of the NaOH aqueous solution in such a way that the gas stream is in contact with the surface of the NaOH aqueous solution; the reaction mixture is continuously stirred to generate a turbulent flow regime, and and wherein the gas stream of $CO_2$ is absorbed at the interface of the stirred liquid phase;

c) stopping the supply of the gas stream comprising $CO_2$ to the carbonator reactor, and d) discharging the reaction mixture containing sodium carbonate from the at least one carbonator reactor and e) optionally, isolating the generated sodium carbonate from the discharged reaction mixture of step d).

The generated sodium carbonate may be isolated by conventional means such as, washing, filtration, column chromatography, decantation, extraction, crystallisation or drying.

The present invention relates to a method for the preparation of $Na_2CO_3$ by capturing $CO_2$ and followed by the heterogeneous reaction of $CO_2$ with an aqueous solution of NaOH in the carbonator reactor of the first aspect (also called "carbonation stirred reactor" or "stirred reactor" herein), according to the reaction scheme 1 described below:

Reaction scheme 1

The reaction takes place via the absorption of the $CO_2$ on the surface of the aqueous NaOH solution and follows the direct hydroxylation route consisting of two stages. The first step is a direct reaction of $CO_2$ with OH—, with overall second-order kinetics, being a first order reaction for $CO_2$ and OH— ions; while the second step is an instantaneous proton transfer chemical reaction:

Reaction scheme 2

The second aspect of the invention relates to a method that, in contrast to previously known processes, does not use any special multiphase contacting apparatus intended to contact the $CO_2$ with NaOH, but that contact is carried out directly on the free surface of the liquid phase, where a gas-liquid interface is formed. Accordingly, the method of the present invention may work with any concentration of reagents, including high concentrations such as those specified in this document.

Therefore, the method of the present invention has the advantage that can be carried out with any concentration of reagents. In a preferred embodiment of the second aspect of the invention, the NaOH aqueous solutions of step a) has a concentration not lower than 10 wt. % of NaOH and a gas stream comprising not lower than 30 wt. % of $CO_2$, thus reducing the requirements for transport and storage of reagents, as well as the dimensions of the installation, the energy consumption and the water footprint. Preferably, the concentration of the NaOH aqueous solution step a) is from 28 wt. % to 77 wt. %, more preferably from 35 wt. % to 55 wt. %; percentages expressed by weight of NaOH with respect to the weight of the NaOH aqueous solution.

Thus, in a preferred embodiment of the method according to the second aspect of the invention, the method comprises the use of the carbonator reactor (1) that provides an efficient heat transmission, which is particularly important in the method for the preparation of sodium carbonate as a strong exothermic reaction takes place, in particular when high concentrations of reagents are used. All the energy generated in the exothermic reaction is efficiently dissipated due to the elevated heat transfer area and the mass flows achieved with the carbonator reactor of the first aspect. Advantageously, the energy generated as a consequence of the carbonation process may be utilized to improve the thermal efficiency of other processes or be converted to other useful forms of energy.

In another preferred embodiment of the method of the second aspect, the flow of gas stream comprising $CO_2$ supplied to the carbonator reactor in step b) may be regulated, so that this flow rate, as measured per unit cross-sectional area of the reactor shell may be maintained constant within a range from 10 to 85 $m^3 \cdot m^{-2} h^{-1}$, preferably from 20 to 46 $m^3 \cdot m^{-2} h^{-1}$, it might be modified according to the requirements of the reaction. For example, in the case of a reactor with a cross-sectional area of 1 $m^2$, the $CO_2$ flow rate is between 10 to 85 $m^3 h^{-1}$.

In particular, the supply of gas stream comprising $CO_2$ to the at least one carbonator reactor according to the first aspect can be stopped at any time by cutting off the $CO_2$ flow or, alternatively, it might be re-directed to a different carbonator reactor. Preferably, the amount of $CO_2$ comprised in the gas stream supplied to the at least one carbonator reactor (1) in step b) is equal to or higher than 30 wt. %, preferably from 80 wt. % to 100 wt. %, more preferably from 90 wt. % to 99.9 wt. %, and even more preferably from 95 wt. % to 99.9 wt. %. Percentages are expressed by weight of $CO_2$ gas in respect to the weight of the gas stream also comprising $CO_2$. These particular embodiments of the invention are preferred because they allow the manufacture of sodium carbonate having high purity up to 99.99 wt. %, while reducing the requirements for transport and storage of diluted reagents, as well as the dimensions of the installation, the energy consumption and the water footprint.

In another preferred embodiment of the method of the second aspect, the flow of the $CO_2$ gas steam of step b) is maintained constant. This may be achieved by means of passing the $CO_2$ gas steam of step b) through a buffer, preferably a damping membrane for flux variations, before being injected into the reactor. This system may be connected to a gas blower of variable speed in order to maintain the $CO_2$ injection flow constant, while allowing the $CO_2$ flow to be regulated depending on the controlled variables in the reactor.

The carbonator reactor of step a) may supply the gas stream comprising $CO_2$ at any flow rate. In a particular embodiment the gas stream comprising $CO_2$ is generated in an industrial alcoholic fermentative process, the flow rate may range from 10 to 85 $m^3 \cdot m^{-2} h^{-1}$, preferably from 20 to 46 $m^3 \cdot m^{-2} h^{-1}$.

In a particular embodiment of the second aspect, the $CO_2$ stream supplied to the at least one carbonator reactor (1) may be generated in an alcoholic fermentative process (AFP), preferably the concentration of the $CO_2$ in the gas stream supply is equal to or higher than 40 wt. %, preferably from 70 wt. % to 99.9 wt. %, more preferably from 80 wt. % to 99.9 wt. %, even more preferably from 90 wt. % to 99.9 wt. %, and particularly preferably from 95 wt. % to 99.9 wt. %, wherein these percentages are expressed by weight of $CO_2$ in respect of the weight to the gas stream comprising $CO_2$. Due to the high purity of $CO_2$ gas stream generated in AFP, previous treatments such as filtration might not be necessary, so that this gas stream can be directly supplied to the at least one carbonator reactor in the method for the preparation of sodium carbonate described herein.

The gas stream comprising $CO_2$ may be generated in AFP carried out in the production of a different beverage such as, for example, wine, beer, any spirit liquor such as whiskey, vodka, anise, gin, rum, tequila, cognac, brandy, cachaça; or any Asian liqueurs such as those produced in Korea, Japan or China. Preferably, the $CO_2$ gas stream is generated in an alcoholic fermentative process carried out in the manufacture of wine.

In a preferred embodiment of the second aspect, the gas stream comprising $CO_2$ is generated in an AFP, the method described herein may comprise a further step wherein volatile compounds or other organic compounds that might be present in the gas stream are removed or at least reduced before supplying such a gas stream comprising $CO_2$ to the at least one carbonator reactor. This additional step may be done, for example, by means of a condenser exchanger or filter connected to the $CO_2$ gas stream supply line prior to the carbonator reactor via a nozzle in the carbonator reactor described in this document.

In another preferred embodiment of the method according to the second aspect of the invention, the step b) can be carried out at pressures from 0-20 barg and at a temperature range from 0-160° C., preferably at pressures from 0.35 barg to 2.30 barg and at a temperature range from 70-140° C. Therefore, the energetic consumption due to gas compression steps which are required when using high pressure, as occurs in some conventional methods, can be controlled, adjusted and minimized. Likewise, the economic cost associated when using complex compression equipment is avoided.

Additionally, the use of the carbonator reactor (1) according to the first aspect in the method of the second aspect, ensures that there is no significant pressure loss inside the carbonator reactor, as the gas stream does not have to pass through the entire liquid phase.

A continuous renovation of the gas-liquid interface is achieved by using the carbonator reactor of the first aspect, as it enhances the mass transfer process. The method of the second aspect allows high absorption flows or $CO_2$ flow rates during the reaction of $CO_2$ with NaOH as a consequence of the turbulences generated in the gas-liquid interface and the continuous renovation thereof provided by the carbonator reactor of the first aspect.

In the method of the second aspect, the gas stream comprising $CO_2$ is introduced in the at least one carbonator reactor (1) so that it is in contact with the surface of the NaOH aqueous solution (liquid phase), giving rise to a reaction mixture wherein $CO_2$ is in contact with such surface of the NaOH aqueous solution by means of a gas-liquid interface; and the reaction mixture is continuously stirred under a turbulent flow regime, so that the renewal of NaOH present on the free surface of the liquid phase in contact with the $CO_2$ is achieved, thus improving the mass transfer process.

In another preferred embodiment of the method according to the second aspect of the invention, the turbulent flow regime has a Reynolds number from 5,000 to 300,000, more preferably the Reynolds number may be from 70,000 to 190,000. Even more preferably, the reaction mixture of step b) is carried out at a temperature from 50° C. to 80° C. and a pressure from 0.02 barg to 0.35 barg, an optimum volumetric mass transfer coefficient $K_L$ may be obtained with a Reynolds number from 70,000 to 190,000. The use of said regime provides a high effective (specific) interfacial area and a continuous renewal of the contact surface, thus maintaining the presence of unreacted OH— absorbent on the surface of the aqueous liquid solution and increasing $CO_2$ absorption. In an even more preferred embodiment, Reynolds number from 70,000 to 190,000 and the gas stream comprising $CO_2$ is injected forming a "plenum" (also referred as "gas bulk") above the liquid phase, so that $CO_2$ may react along the entire contact surface. Said conditions provide a high effective (specific) interfacial area and a continuous renewal of the contact surface. Preferably, the gas bulk is at least 3% of the total internal volume of the reactor body, preferably from 15% to 40% of the said volume.

In the context of the present invention, the term "gas bulk", also referred to as "plenum", is understood as the internal volume of the reactor body addressed to house the gas stream comprising $CO_2$ during the carbonation reaction.

In the context of the present invention, it should be understood that all pressures are relative pressures (i.e., the difference between absolute pressure and atmospheric pressure). The relative pressure is usually measured with a manometer and, therefore, it is also known as manometric pressure. In the context of the present invention, relative pressure is commonly expressed in barg (bar gauge pressure), which corresponds to 105 Pa.

In another preferred embodiment of the method according to the second aspect of the invention, the stirring speed of step b) ranges from 50 to 400 rpm and/or the reaction mixture has a pattern of liquid free surface renewal speed of at least 0.06 m/s.

In another preferred embodiment of the method of the second aspect, the reactor (1) of step a) has a stirring system which comprises one or more turbine impellers, as previously described, so the specific Gas-Liquid contact area together with the continuous renewal of the contact surface is improved, avoiding interruptions in the absorption process.

In another preferred embodiment of the method of the second aspect, the at least one carbonator reactor (1) of step a) comprises a stirring system comprising at least one impeller comprising inclined blades, preferably said blades make an angle from 5° to 60° with respect to the vertical axis; and/or at least one baffle, preferably the width (wd) of said baffle ranges from 1% to 15% of the internal diameter (D) of a cylindrical shell comprised in the body of the carbonator reactor. Thus, an improved mass transfer from the gas into the liquid is achieved. This facilitates and improves the chemical reaction between $CO_2$ and NaOH.

In another preferred embodiment of the method of the second aspect, the flow of gas stream of step b) comprising $CO_2$ is preferably equal to or higher than flow rate of the system, thus a negative pressure in the carbonator reactor is prevented, which could result in suction of the reaction mixture. Thus, the flow of gas stream of step b) comprising $CO_2$ is preferably equal to or higher than the range form 10 and 85 $m^3 \cdot m^{-2} h^{-1}$, preferably from 20 to 46 $m^3 \cdot m^{-2} h^{-1}$. Preferably, the supply of the gas stream comprising $CO_2$ of step b) may be carried out at a temperature equal to or lower than 160° C. and a pressure equal to or lower than 20 barg. More preferably, at atmospheric pressure and a temperature from 10 to 80° C. as the $CO_2$ flow rate of the reaction mixture can be reduced. Even more preferably from 60° C. to 80° C., wherein the $CO_2$ absorption flow rate can be reduced by more than 40% above this temperature under atmospheric pressure.

In another preferred embodiment of the method of the second aspect, the flow rate, also referred as to absorption flow rate per unit of geometric area, at a temperature equal to or lower than 80° C. and a pressure equal to or lower than 0.35 barg, is in the range of between preferably from 20 to 46 $m^3 \cdot m^{-2} h^{-1}$.

In another preferred embodiment of the method of the second aspect, when the temperature of the reaction mixture in step b) is higher than 80° C. the pressure of the system used in step b) is equal to or higher than the vapor pressure of the system. Preferably the temperature of the reaction does not exceed 160° C., in that way, the generated vapor and degradation of $Na_2CO_3$ is avoided.

In another preferred embodiment of the method of the second aspect, the supply of gas stream of step b) comprising $CO_2$ to the at least one carbonator reactor may be stopped once the desired degree of $CO_2$ capture or conversion has been achieved. In a particular embodiment, the $CO_2$ gas stream supply may be stopped once the pH of the reaction mixture reaches values from 8 to 12.8.

In another preferred embodiment of the method of the second aspect, the NaOH aqueous solution of step a) has a NaOH concentration from 35 wt. % to 55 wt. % and the supply of the gas stream comprising $CO_2$ to the carbonator reactor of step c) is stopped when the pH of the NaOH aqueous solution ranges from 12.0 to 12.8. When working under these conditions, the obtained sodium carbonate will have a purity of at least 99%. The pH of the reaction mixture can be monitored by means of a pH-meter with a high alkalinity electrode on samples taken from the reactor.

Advantageously, the rate of reaction is increased by the presence of OH— ions in step b) as an absorbate. The method of the present invention may work in a semi-continuous regime by supplying $CO_2$ in a controlled manner, so that the reaction can be safely stopped at any time, e.g., in case the operation parameters were outside the safety limits established.

In the method of the second aspect, sodium carbonate monohydrate ($Na_2CO_3 \cdot H_2O$) alongside sodium carbonate in solution may be produced. The sodium carbonate monohydrate can be subsequently dried to obtain $Na_2CO_3$. In the method described herein further products can be obtained, if an excess of OH—, from the NaOH aqueous solution, is provided to the reaction media. Thus, as all the OH—, from the NaOH aqueous solution, is consumed, the reaction should preferably be stopped. If an excess of OH— groups is provided to the reaction media, a mixture of carbonates containing traces of sodium bicarbonate ($NaHCO_3$), as well as a variety of other carbonates, such as, trisodium hydrogendicarbonate dihydrate and sodium sesquicarbonate dihydrate ($Na_2CO_3 \cdot NaHCO_3 \cdot 2H_2O$) may also be obtained in the final product. These products may easily be separated or isolated and marketed directly with the same applications as $Na_2CO_3$. Preferably, the method of the second aspect further comprises separating any sodium carbonate monohydrate formed in the reaction media, from the discharged reaction mixture, preferably by filtration or centrifugation.

In another preferred embodiment of the method of the second aspect, sodium carbonate monohydrate obtained or obtainable by the method of the second aspect may have a purity between 60.00 wt. % and 99.99 wt. %, preferably between 80.00 wt. % and 99.99 wt. %, more preferably between 90.00 wt. % and 99.99 wt. %. Characterisation of the sodium carbonate monohydrate can be carried out by means of X-ray diffraction as well as the determination of phase purity.

The strong exothermic reaction, which takes place in the method of the second aspect, generates a significant amount of heat energy that can be extracted by conventional means such as a cooling jacket and/or a coil. This heat energy can be re-used to improve the efficiency of other processes steps carried out in this method or in other methods in the facility, or otherwise may be transformed into another useful type of energy.

In another preferred embodiment of the method according to the second aspect, the carbonator reactor of step a) comprises at least one gas injector or nozzle designed to introduce the gas stream comprising $CO_2$ in the carbonator reactor, wherein the NaOH aqueous solution is contained, giving rise to a reaction mixture, in particular a heterogeneous reaction mixture formed by the NaOH aqueous solution (liquid) and the gas stream comprising $CO_2$ (gas), so the yield of the sodium carbonate and the reaction rate is improved. It is recommended that this nozzle has a minimum diameter of 30 mm, and that the opening should be preferably located at the upper portion of the reactor body within the upper 10% of the height of the reactor body to avoid obstruction and/or splashing.

In another preferred embodiment of the method according to the second aspect, the carbonator reactor further comprises at least one inlet adapted for introducing liquids, slurries, solids or mixtures thereof. In particular, it might comprise at least one inlet specifically configured for introducing liquids or slurries, and at least one inlet specifically configured for introducing solids. Additionally, the carbonator reactor also comprises at least one outlet adapted for discharging a liquid phase or slurry, in particular, this outlet is specifically configured for discharging the reaction mixture containing sodium carbonate from the at least one carbonator reactor in steps d) of the method of the second aspect.

In another preferred embodiment of the method according to the second aspect, the method for the preparation of sodium carbonate may be carried out in at least two independent carbonator reactors. In those particular embodiments, the method further comprises the following steps:

f) cleaning the discharged carbonator reactor of step d) and adding further aqueous NaOH solution to the cleaned carbonator reactor, providing a further carbonator reactor containing NaOH aqueous solution as defined in step a);

g) supplying said gas stream comprising $CO_2$ to one of the at least two carbonator reactors provided in step a) different to that of step b), wherein the gas stream is introduced in said carbonator reactor above the surface of the NaOH aqueous solution, and the reaction mixture is continuously stirred following a turbulent flow regime;

h) stopping the supply of gas stream comprising $CO_2$ used in step f);

i) discharging the resulting reaction mixture of step g); and j) optionally cleaning the discharged carbonator reactor of step h) and optionally adding further aqueous NaOH solution to the cleaned reactor, providing a further carbonator reactor containing NaOH aqueous solution as defined in step a).

The third aspect of the present invention refers to use of a carbonator reactor (1) of the first aspect in a process for the preparation of sodium carbonate. Preferably, in a process for the for the preparation of sodium carbonate by means of capturing of $CO_2$ in a NaOH aqueous solution.

EXAMPLES

In the following, the invention will be further illustrated by means of Examples. The Examples should in no case be interpreted as limiting the scope of the invention, but only as an illustration of the invention.

Example 1: Preparation of $Na_2CO_3$ by Capturing $CO_2$ in a NaOH Aqueous Solution (Laboratory Scale)

For this purpose, an installation comprising a carbonation stirred reactor (see FIGS. 1a and 1b) was built to work in a semi-continuous regime, specifically by supplying discontinuously the NaOH aqueous solution, and continuously the $CO_2$ gas stream flow. The 3 L Pyrex glass reactor (101) had a thickness of 3 mm and four baffles (115) uniformly distributed along the walls of the reactor body (103) with an edge of between 3 and 5 mm. The height/diameter ratio of the reactor body was close to 70%. In addition, the carbonator reactor comprised a stirring system (102) formed by two impeller turbines (113) having 4 blades (114) inclined 48°. The agitation system (102) had a motor (112) with adjustable speed between 0 and 700 rpm and a stirred shaft (119). Likewise, the reactor had a lid with a nozzle adapted for gas injection (104), and several inlets for probe insertion, agitator placement, etc. (see FIG. 1b). To guarantee heat dissipation and maintain a constant working temperature, a 50 L thermostatic bath was used with water as the main cooling fluid, thus allowing the desired setpoint temperature in the reactor to be regulated. For this purpose, the reactor had a temperature probe (internal thermocouple) for monitoring the temperature of the agitated phase (resistant to strongly basic media) and another for measuring the temperature of the thermostated bath. The pH was controlled by means of a pH-meter with a specific electrode for strongly basic media, as well as by taking samples for its due chemical evaluations. The gas was directly injected from the gas cylinder by means of a pressure reducer connected to a nozzle (104), which introduced the gas stream comprising $CO_2$ in the carbonator reactor above the surface of the NaOH aqueous solution, while maintaining the reaction mixture continuously stirred following a turbulent agitation regime. The gas flow rate was measured by means of $CO_2$ by using flowmeters.

During the development of the experiment, with a NaOH 12.0 M aqueous solution at pressures up to 2.0 barg and temperatures between 5 and 160° C., the present invention was demonstrated to be viable, achieving a volumetric rate of $CO_2$ consumption between 0.02 and 30 L/min. The Np converged to a range between 1.8 and 2.6 for Reynold numbers higher than 120,000. The reaction process is stopped when a pH of 12.4 is reached. The identity of the formed products was determined by advanced XRD techniques which revealed the high purity of sodium carbonate (99.99%), with the presence of secondary phases at trace level due to the formation of bicarbonates or trona in some experimental tests. Yield 100%.

Example 2: Preparation of $Na_2CO_3$ by Capturing $CO_2$ in a NaOH Aqueous Solution (Pre-Pilot Scale)

Figure 1A:
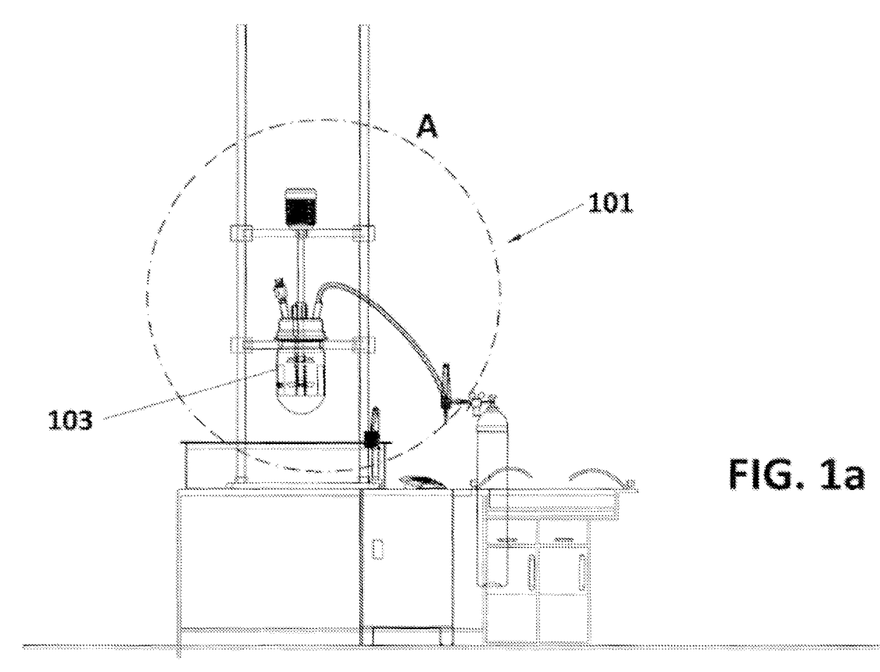
FIG. 1a shows the installation used in example 1, wherein a demonstrative experimental development on a laboratory scale was carried out, with a volume of 3 L carbonator reactor destined to the capture of highly concentrated industrial $CO_2$ gas (99.999%) supplied by means of compressed gas bottles.
Figure 1B:
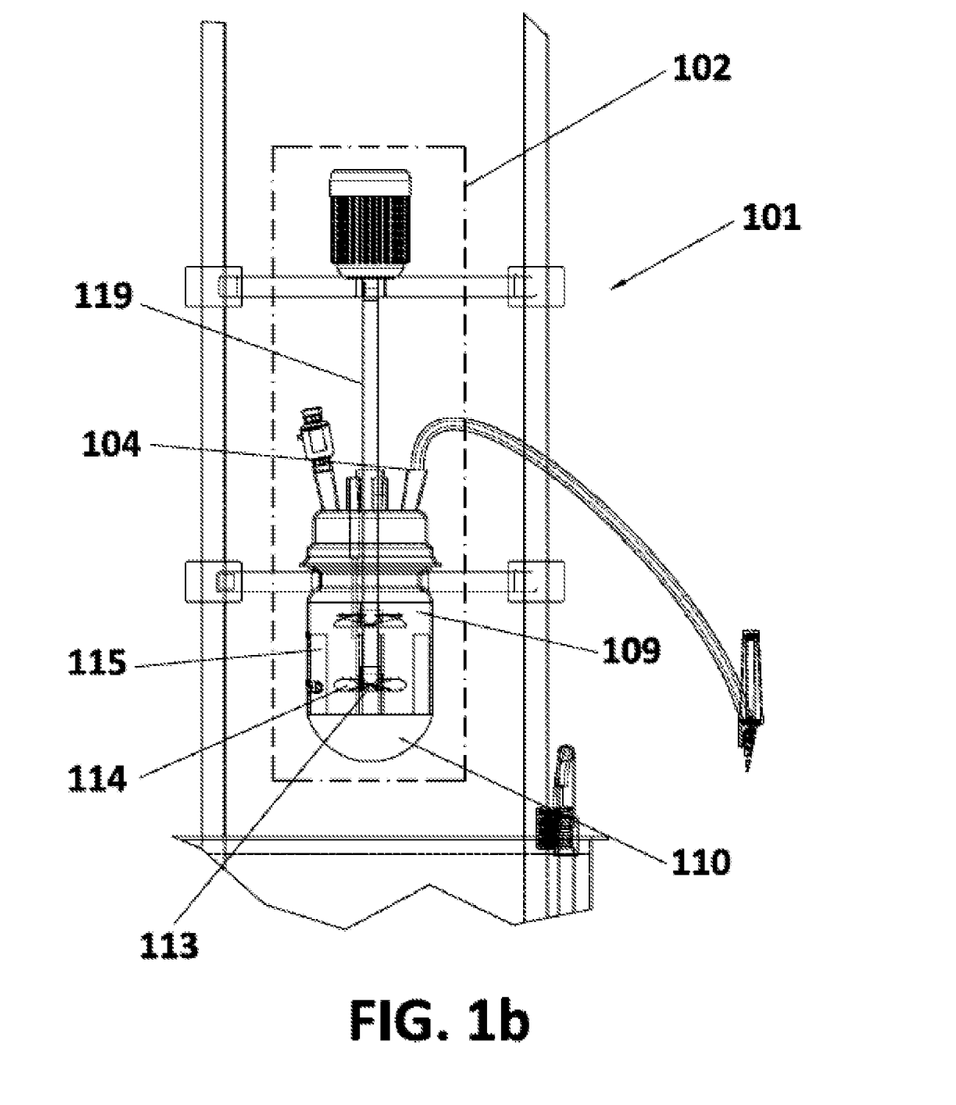
FIG. 1b corresponds to an enlargement view of FIG. 1a, wherein the carbonator reactor used in example 1 is shown.
Figure 2A:
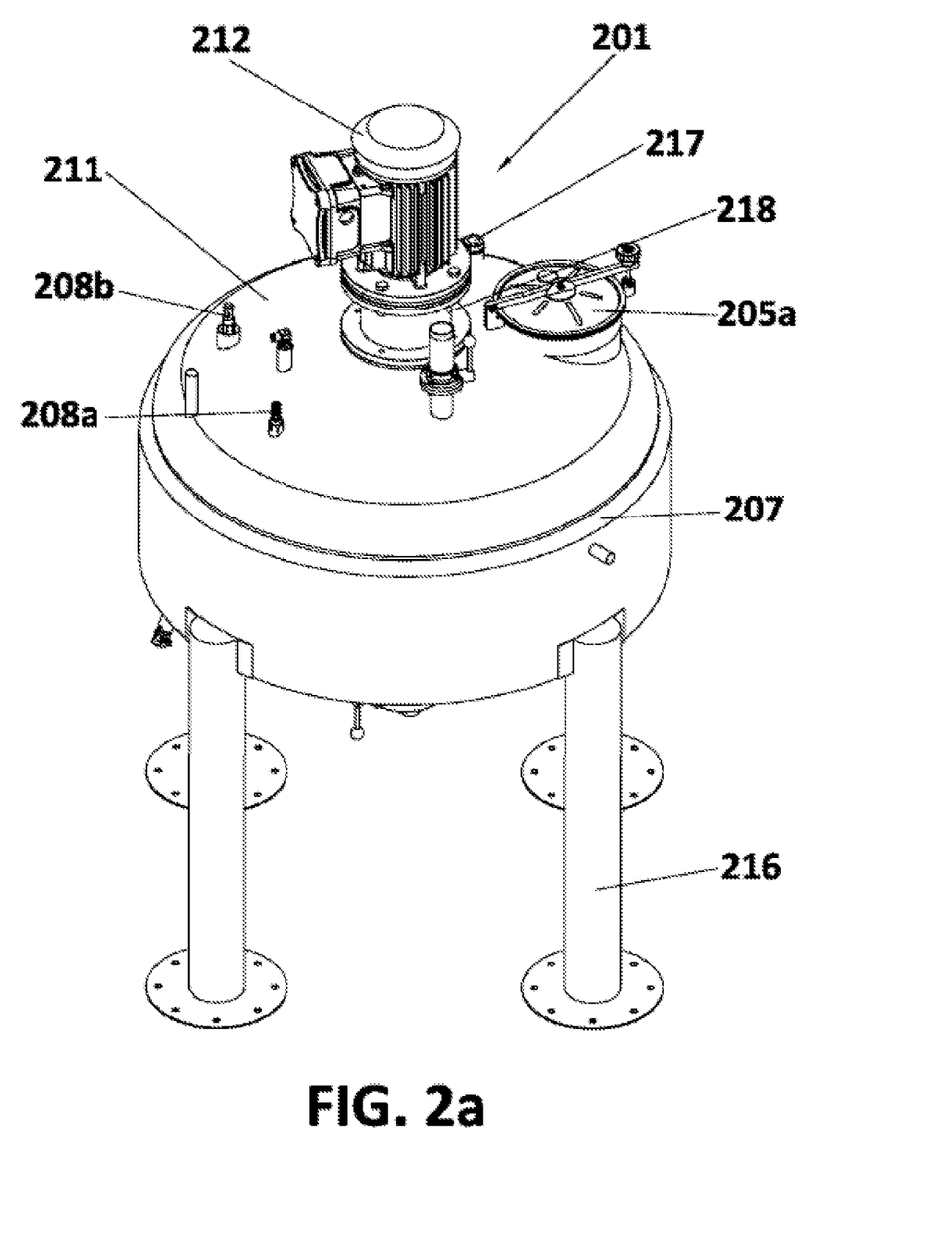
FIG. 2 shows the different parts that compose a carbonator reactor according to the invention. This embodiment of carbonator reactor was used in example 2, wherein a demonstrative application of this invention for the capture of $CO_2$ in described. More specifically, this carbonator reactor was used in an agro-food industry in which $CO_2$ is produced in the fermentation process stage (AFP), with a purity of between 30.000% and 99.999%.
Figure 2B:
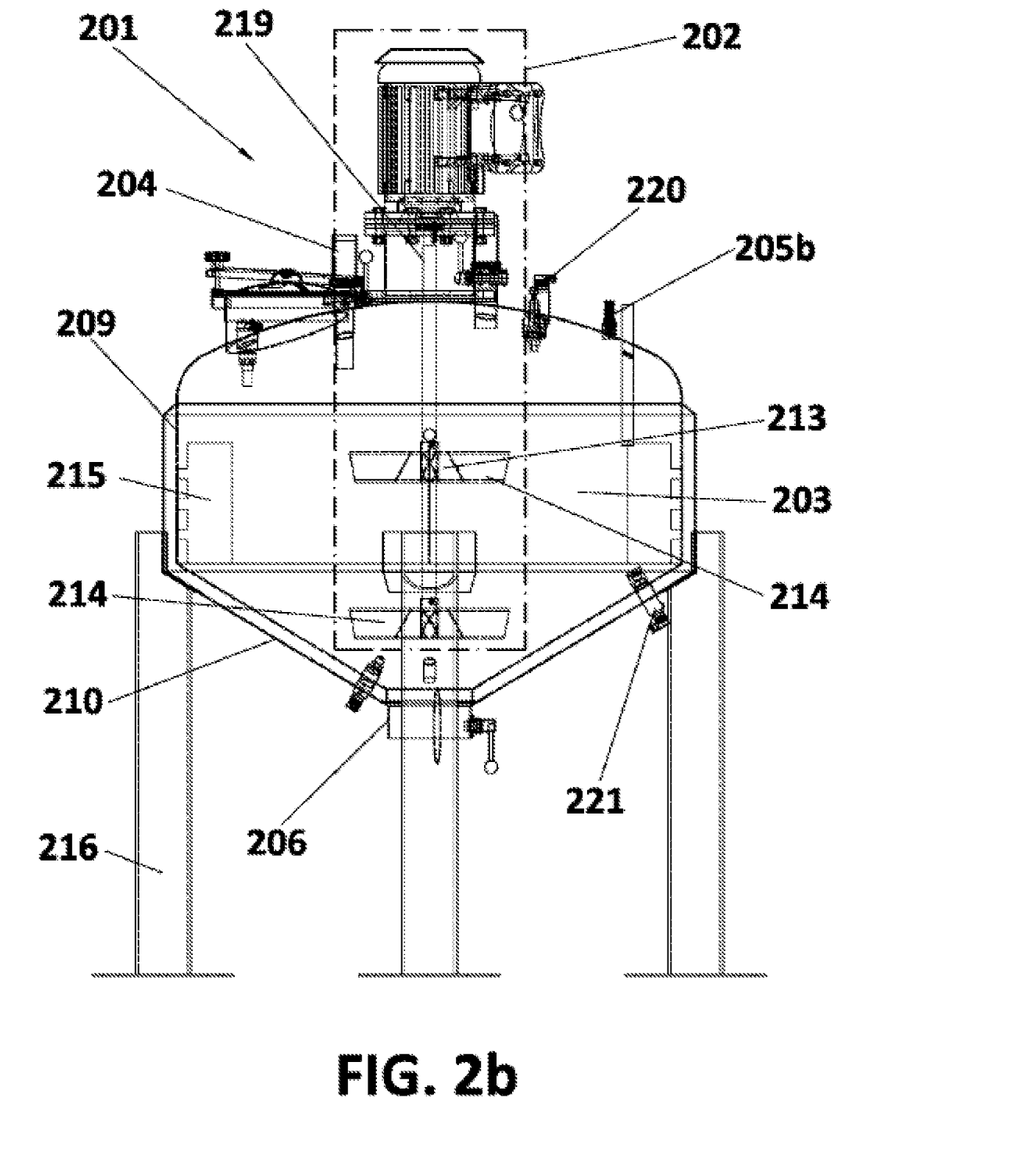
Figure 3A:
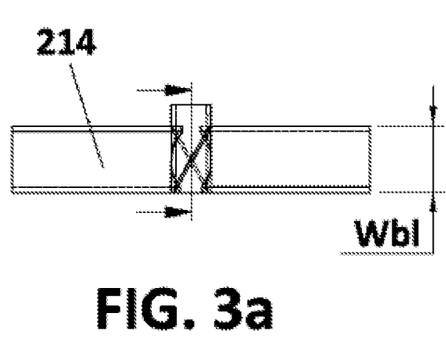
FIG. 3 depicts different views (3a, 3b, 3c and 3d) of a particular stirring system according to the invention, wherein the impeller comprises 4 inclined blades.
Figure 3B:
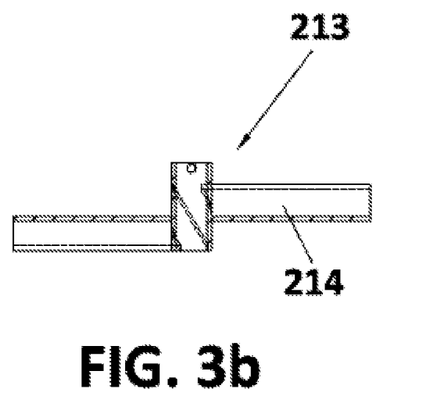
Figure 3C:
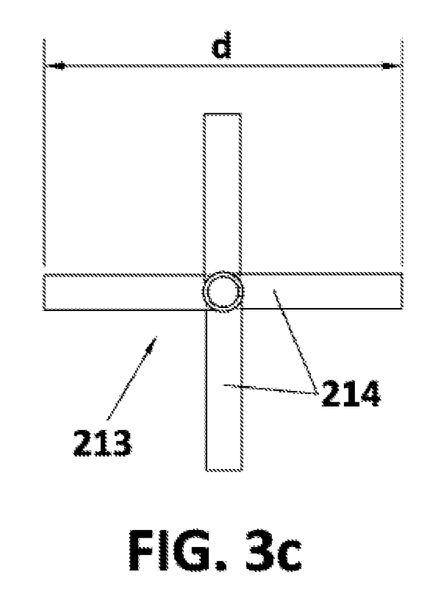
Figure 3D:
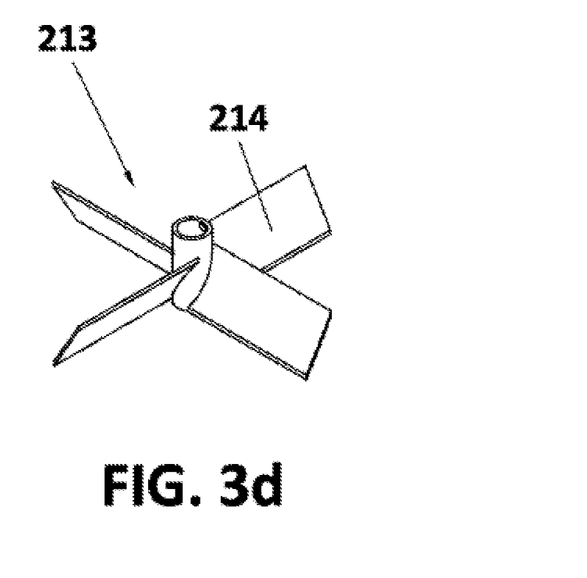
Figure 4A:
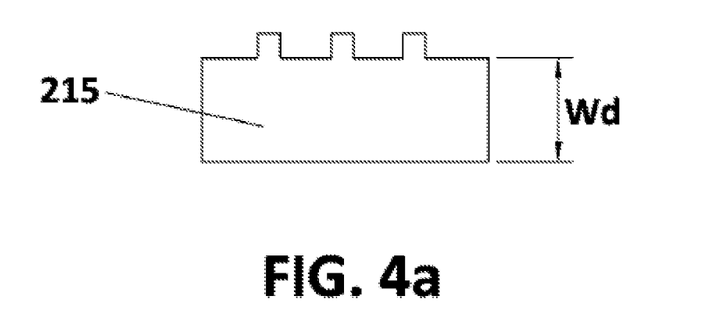
FIG. 4 shows a particular embodiment of the baffle according to the invention (4a), and their position in the carbonator reactor body (4b and 4c).
Figure 4B:
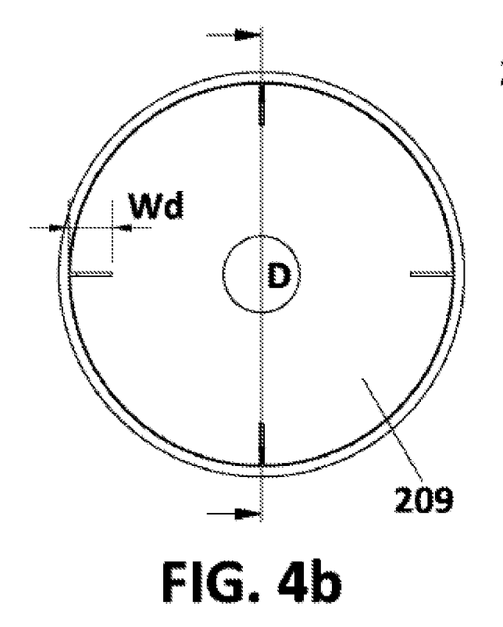
Figure 4C:
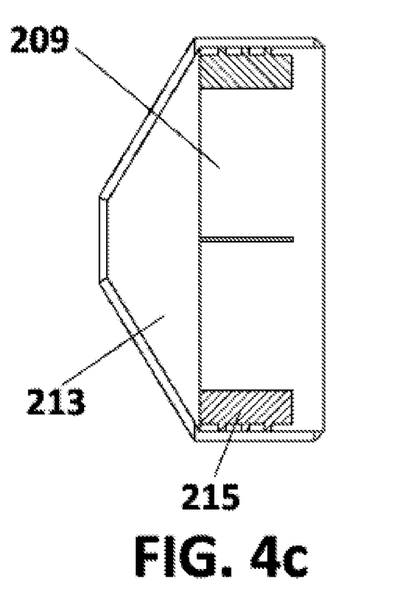

A further demonstrative example was carried out in a carbonator reactor according to the invention on a "Pre-Pilot" scale located in an agri-food industry (see FIG. 2). Specifically, the carbonator reactor (201) was installed in a wine producing industry, wherein the $CO_2$ generated in one of the stages of its productive process of alcoholic fermentation was captured. According to this particular embodiment of the invention, a 10 mm thick A316L stainless steel "Pre-Pilot" scale stirred reactor (201) of 790 L was built, wherein the stirred reactor (201) comprises a body (203) with a conical bottom (210), a cylindrical shell (209) and an ellipsoidal head (211) supported by vertical legs (216). The shoulder height of the reactor was 1.7 m. The reactor had a height/diameter ratio of at least 80%. It also had four 100 mm edge baffles (215) that were 1 m long and 4 mm thick. As in example 1, the reaction worked in a semi-continuous regime, for convenience, and at pressures of between 0 and 2.0 barg. To work in this range, the increase of the $CO_2$ pressure was made by means of a positive displacement blower (not shown in FIG. 2) as means for regulating the pressure. Additionally, the reactor (201) included the installation of overpressure relief valve (208a) and vacuum relief valve (208b) calibrated to avoid damages. Likewise, this carbonator reactor (201) was provided with a conventional type jacket having spiral deflectors as means for regulating the temperature (207) and, in particular, to cool down the reactor body with a minimum standard channel space of 30 mm, thus controlling the working temperatures up to 160° C. The cooling area covered about 80% of the entire reactor area. The cooling water came directly from the cooling system of the warehouse itself. First of all, an aqueous solution of NaOH 35% wt. was supplied to the carbonator reactor (201) coming from intermediate bulk containers, then a supply of a gas stream comprising between 30.0% wt. and 99.9 wt. % of $CO_2$ was injected into the stirred reactor (201) by a nozzle (204) above the surface of the NaOH aqueous solution, being the $CO_2$ absorbed at the interface of the stirred liquid phase as described above. The reaction mixture was continuously stirred following a turbulent agitation regime. In particular, the agitation was carried out by means of the stirring system (202) that incorporates a stirrer gearbox (218), 2 impeller turbines (213) with 4 blades (214) each one, wherein the blades (214) (see also FIG. 3) are inclined 48° with respect to the vertical axis and variable in height. The stirring system (202) was driven by a 6 hp motor (212). The assembly of this system was rigid-type, with a guiding turret that assembles the solid shaft (219) of 35 mm and 800 mm long with a reduction stirrer gearbox (218) of 170 Nm of nominal torque. With regard to instrumentation and control, two temperature sensors (221) were used, located crosswise, to control hot zones during the reaction. In the same way, the temperature, flow, humidity and purity of the $CO_2$ fed in from the fermenters were measured by means of flowmeters and capacitive purity sensors. On the other hand, the volume of the liquid phase was controlled by a low frequency level sensor (217). The $CO_2$ pressure in the reactor was controlled by a gas pressure sensor (220). Finally, the pH was controlled by means of sampling using a pH-meter with a high alkalinity electrode.

The flow, pressure, and temperature of the cooling water was also controlled. The control of the process was carried out by means of different industrial control automatons. The plenum, i.e., the internal volume of the reactor body addressed to house the gas stream comprising $CO_2$ during the carbonation reaction comprises 25% of the total volume of the reaction mixture. In this process, absorption flow rate up to 950 L/min were obtained. After obtaining a 100% conversion, when the pH of 12.4 is reached, the obtained product was then discharged by the outlet adapted for discharging slurry (206). This product was then filtrated using a centrifuge and left to dry. The resulting powder was characterized as a sodium carbonate with a phase purity of between 80% and 99% through X-Ray Diffraction techniques. Yield 100%.

The invention claimed is:

1. A carbonator reactor comprising:
a reactor body;
a means for regulating a temperature;
a means for regulating a pressure; and
a stirring system; and
wherein the reactor body comprises:
   a cylindrical shell,
   at least one inlet adapted for introducing liquids, solids, or mixtures thereof,
   at least one outlet adapted for discharging a liquid phase or a slurry, and
   a nozzle, the nozzle for supplying a gas stream into reactor body and above the surface of the liquid phase so the gas stream can come into direct contact with the surface of the liquid phase, the nozzle is located at an upper portion of the reactor body, within an upper 10% of a height of the reactor body;
wherein the stirring system comprises an impeller and at least one baffle,
   the impeller comprising a solid shaft and a plurality of blades, each of the plurality of blades being inclined at an angle from 20° to 45° with respect to a vertical axis, wherein the plurality of blades is at least three blades, and
   the at least one baffle regulating stirring of the liquid phase and a mass transfer of a gas into a surface of the liquid phase, wherein a width (wd) of the at least one baffle ranges from left to right from 1% to 15% of the internal diameter (D) of the cylindrical shell.

2. The carbonator reactor according to claim 1, wherein the plurality of blades comprises from three to eight blades having a width from 15% to 30% of the diameter (d) of the stirrer formed by the blades of the stirring system.

3. The carbonator reactor according to claim 1, wherein the stirring system has a power number (Np) between 0.4 and 4.3.

4. The carbonator reactor according to claim 1, wherein the reactor body further comprises a conical bottom or an ellipsoidal head or a torispherical head.

5. The carbonator reactor according to claim 1,
wherein the ratio (d/D) of the stirring system is from 20% to 45%;
wherein the ratio (d/D) is a ratio of the exterior diameter (d) of the stirrer formed by the plurality of blades of the stirring system and the internal diameter (D) of the reactor cylindrical body.

6. The carbonator reactor according to claim 1, wherein the at least one baffle is also adapted to reduce formation of a precipitate at the center of the reactor body.

7. The carbonator reactor according to claim 1, further comprising a pressure sensor and the means for regulating the pressure regulates the pressure from 2 to 20 barg.

8. The carbonator reactor according to claim 1, wherein the means for regulating the pressure is a low-pressure compressor connected to a pressure tank.

9. A method for the preparation of sodium carbonate, the method comprising:
a) providing at least one carbonator reactor, the at least one carbonator reactor comprising:
   a reactor body;
   a means for regulating a temperature;
   a means for regulating a pressure; and
   a stirring system; and
   wherein the reactor body comprises:
      a cylindrical shell,
      at least one inlet adapted for introducing liquids, solids, or mixtures thereof,
      at least one outlet adapted for discharging a liquid phase or a slurry, and
      a nozzle, the nozzle for supplying a gas stream into reactor body and above the surface of the liquid phase so the gas stream can come into direct contact with the surface of the liquid phase, the nozzle is located at an upper portion of the reactor body, within an upper 10% of a height of the reactor body;
   wherein the stirring system comprises an impeller and at least one baffle,
      the impeller comprising a solid shaft and a plurality of blades, each of the plurality of blades being inclined at an angle from 20° to 45° with respect to a vertical axis, wherein the plurality of blades is at least three blades, and
      the at least one baffle regulating stirring of the liquid phase and a mass transfer of a gas into a surface of the liquid phase, wherein a width (wd) of the at least one baffle ranges from left to right from 1% to 15% of the internal diameter (D) of the cylindrical shell;
   the carbonator reactor containing a NaOH aqueous solution;
b) supplying a gas stream comprising $CO_2$ to the carbonator reactor provided in step a),
   wherein the gas stream is introduced in the carbonator reactor, above the surface of the NaOH aqueous solution, in such a way that the gas stream is in contact with the surface of the NaOH aqueous solution;
   wherein the reaction mixture is continuously stirred to generate a turbulent flow regime,
   wherein the gas stream of $CO_2$ is absorbed at the surface of the stirred liquid phase;
c) stopping the supply of the gas stream comprising $CO_2$ to the carbonator reactor, and
d) discharging the reaction mixture containing sodium carbonate from the carbonator reactor.

10. The method for the preparation of sodium carbonate according to claim 9, which comprises a further step e), wherein the sodium carbonate discharged in step d) is isolated from the reaction mixture.

11. The method for the preparation of sodium carbonate according to claim 9, wherein the NaOH aqueous solutions of step a) has a concentration equal to or higher than 10 wt. % or from 28 wt. % to 77 wt. %.

12. The method for the preparation of sodium carbonate according to claim 9, wherein the amount of $CO_2$ comprised in the gas is equal to or higher than 30 wt. % or from 80 wt % to 100 wt %.

13. The method for the preparation of sodium carbonate according to claim 9, further comprising the step of stopping the supply of the gas stream comprising $CO_2$ to the carbonator reactor, when the pH of the reaction mixture of step b) ranges from 8 to 12.8.

14. The method for the preparation of sodium carbonate according to claim 9, wherein the $CO_2$ gas stream is generated in an alcoholic fermentative process.

15. The method for the preparation of sodium carbonate according to claim 9, wherein supplying the gas stream comprising $CO_2$ to the at least one carbonator reactor is at a temperature below 160° C. and a pressure equal to or lower than 20 barg.

16. The method for the preparation of sodium carbonate according to claim 9, wherein the flow of gas stream per unit cross-sectional area of the cylindrical shell of step b) comprising $CO_2$ is from 10 and 85 m3·m-2 h-1.

17. The method for the preparation of sodium carbonate according to claim 9, wherein the gas stream comprising $CO_2$ is injected in the carbonator reactor forming a gas bulk above the liquid phase and the gas bulk is at least 3% of the total internal volume of the reactor body of at least one carbonator reactor.

18. A method of using a carbonator reactor for the preparation of sodium carbonate by capture of $CO_2$ in a NaOH solution,
the carbonator reactor comprising:
  a reactor body;
  a means for regulating a temperature;
  a means for regulating a pressure; and
  a stirring system; and
  wherein the reactor body comprises
    a cylindrical shell,
    at least one inlet adapted for introducing liquids, solids, or mixtures thereof,
    at least one outlet adapted for discharging a liquid phase or a slurry, and
    a nozzle, the nozzle for supplying a gas stream into reactor body and above the surface of the liquid phase so the gas stream can come into direct contact with the surface of the liquid phase, the nozzle is located at an upper portion of the reactor body, within an upper 10% of a height of the reactor body;
wherein the stirring system comprises an impeller and at least one baffle,
  the impeller comprising a solid shaft and a plurality of blades, each of the plurality of blades being inclined at an angle from 20° to 45° with respect to a vertical axis, wherein the plurality of blades is at least three blades, and
  the at least one baffle regulating stirring of the liquid phase and a mass transfer of a gas into a surface of the liquid phase, wherein a width (wd) of the at least one baffle ranges from left to right from 1% to 15% of the internal diameter (D) of the cylindrical shell;
the method comprising the steps of:
  supplying a gas stream comprising $CO_2$ to the carbonator reactor,
    wherein the gas stream is introduced in said carbonator reactor, above the surface of the NaOH aqueous solution, in such a way that the gas stream is in contact with the surface of the NaOH aqueous solution;
    wherein the reaction mixture is continuously stirred to generate a turbulent flow regime,
    wherein the gas stream of $CO_2$ is absorbed at the surface of the stirred liquid phase;
  stopping the supply of the gas stream comprising $CO_2$ to the carbonator reactor, and
  discharging the reaction mixture containing sodium carbonate from the carbonator reactor.

19. The method for the preparation of sodium carbonate according to claim 17, wherein the gas bulk is from 15% to 40% of the said volume.

* * * * *